(12) United States Patent
Geiger et al.

(10) Patent No.: US 12,281,728 B2
(45) Date of Patent: Apr. 22, 2025

(54) FLUID CONNECTION ARRANGEMENT

(71) Applicant: Veritas AG, Gelnhausen (DE)

(72) Inventors: Berthold Geiger, Linsengericht (DE);
Sergio Pascuzzi, Linsengericht (DE);
Andreas Walter, Gruendau (DE)

(73) Assignee: Veritas AG, Gelnhausen (DE)

( * ) Notice: Subject to any disclaimer, the term of this patent is extended or adjusted under 35 U.S.C. 154(b) by 0 days.

(21) Appl. No.: 18/470,864

(22) Filed: Sep. 20, 2023

(65) Prior Publication Data

US 2024/0027000 A1   Jan. 25, 2024

Related U.S. Application Data

(62) Division of application No. 17/507,234, filed on Oct. 21, 2021.

(30) Foreign Application Priority Data

Oct. 29, 2020  (DE) ..................... 10 2020 128 531.0

(51) Int. Cl.
*F16L 13/08* (2006.01)
*B23K 1/00* (2006.01)
*B23K 101/06* (2006.01)

(52) U.S. Cl.
CPC ............ *F16L 13/08* (2013.01); *B23K 1/0008* (2013.01); *B23K 2101/06* (2018.08)

(58) Field of Classification Search
CPC .... B23K 2101/06; B23K 1/0008; F16L 13/08
See application file for complete search history.

(56) References Cited

U.S. PATENT DOCUMENTS 5,380,048 A  *  1/1995  Vogel ..................... F16L 13/08
                                                    228/183
2017/0114932 A1    4/2017  Nakajima et al.
2019/0309877 A1   10/2019  Clausen et al.

FOREIGN PATENT DOCUMENTS

DE    10 2015 104 538 A1   9/2016
FR         1 133 503 A     3/1957
GB           1512961 A  *  6/1978  ............ B21D 39/04
WO    WO 2017/168882 A1  10/2017

* cited by examiner

*Primary Examiner* — Moshe Wilensky
(74) *Attorney, Agent, or Firm* — Holland & Hart LLP

(57) ABSTRACT

The present disclosure relates to a fluid connection arrangement for establishing a fluid connection, including a receiving part having a receiving wall that has a receiving wall inner side that delimits an interior of the receiving part, a tubular connecting part that is at least partially received in the interior of the receiving part and has a tube wall having a plurality of comb-shaped support points that extend along a longitudinal direction of the tubular connecting part, the comb-shaped support points contacting the receiving wall inner side. The tube wall may have at least one curved wall area that extends between two adjacent comb-shaped support points. Between the at least one curved wall area of the tubular connecting part and the receiving wall inner side of the receiving part at least one gap is arranged where a solder is received to establish a materially bonded and fluid-tight connection.

10 Claims, 3 Drawing Sheets

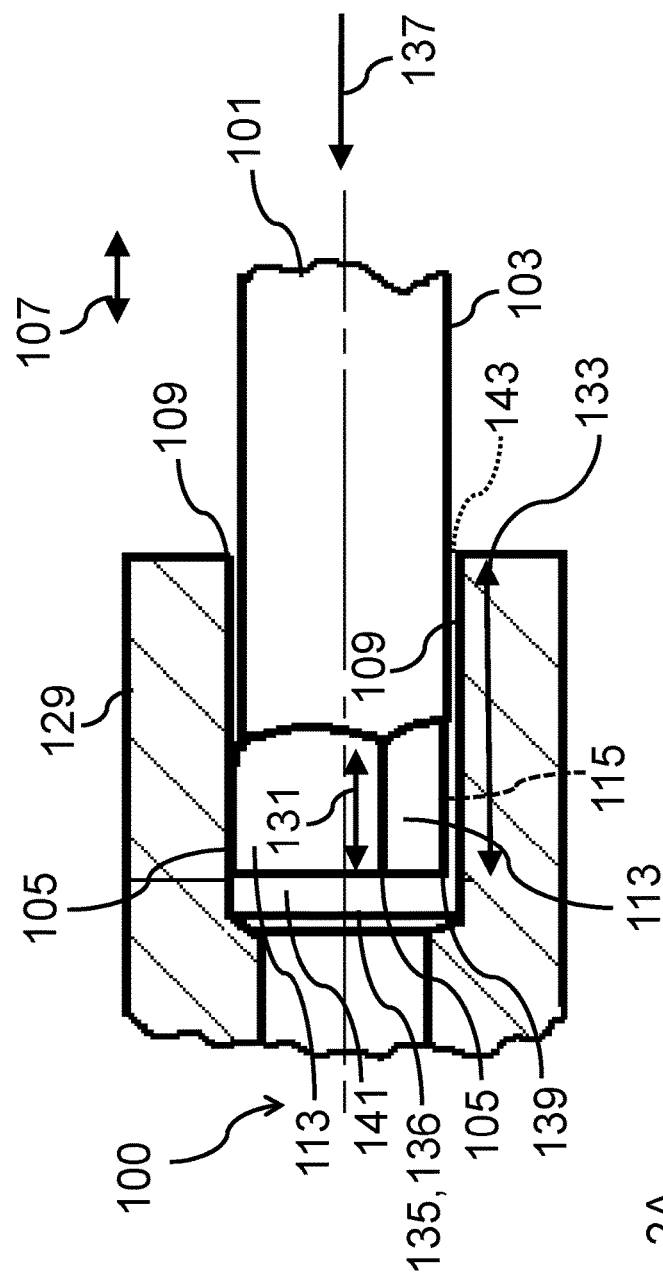
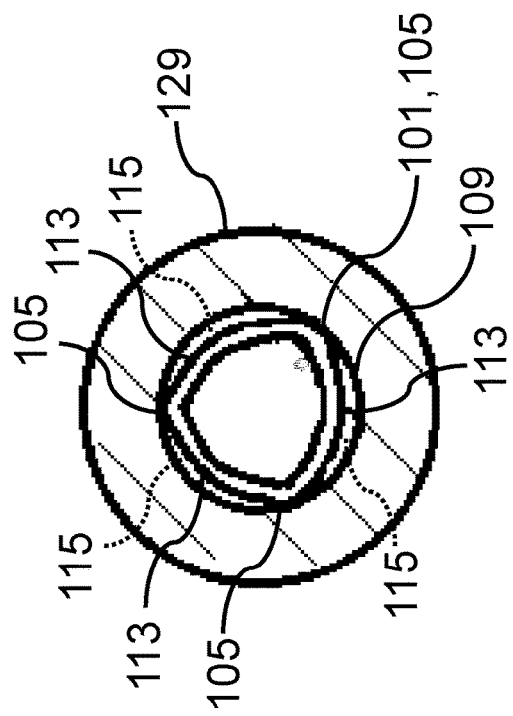
FIG. 2A
FIG. 2B

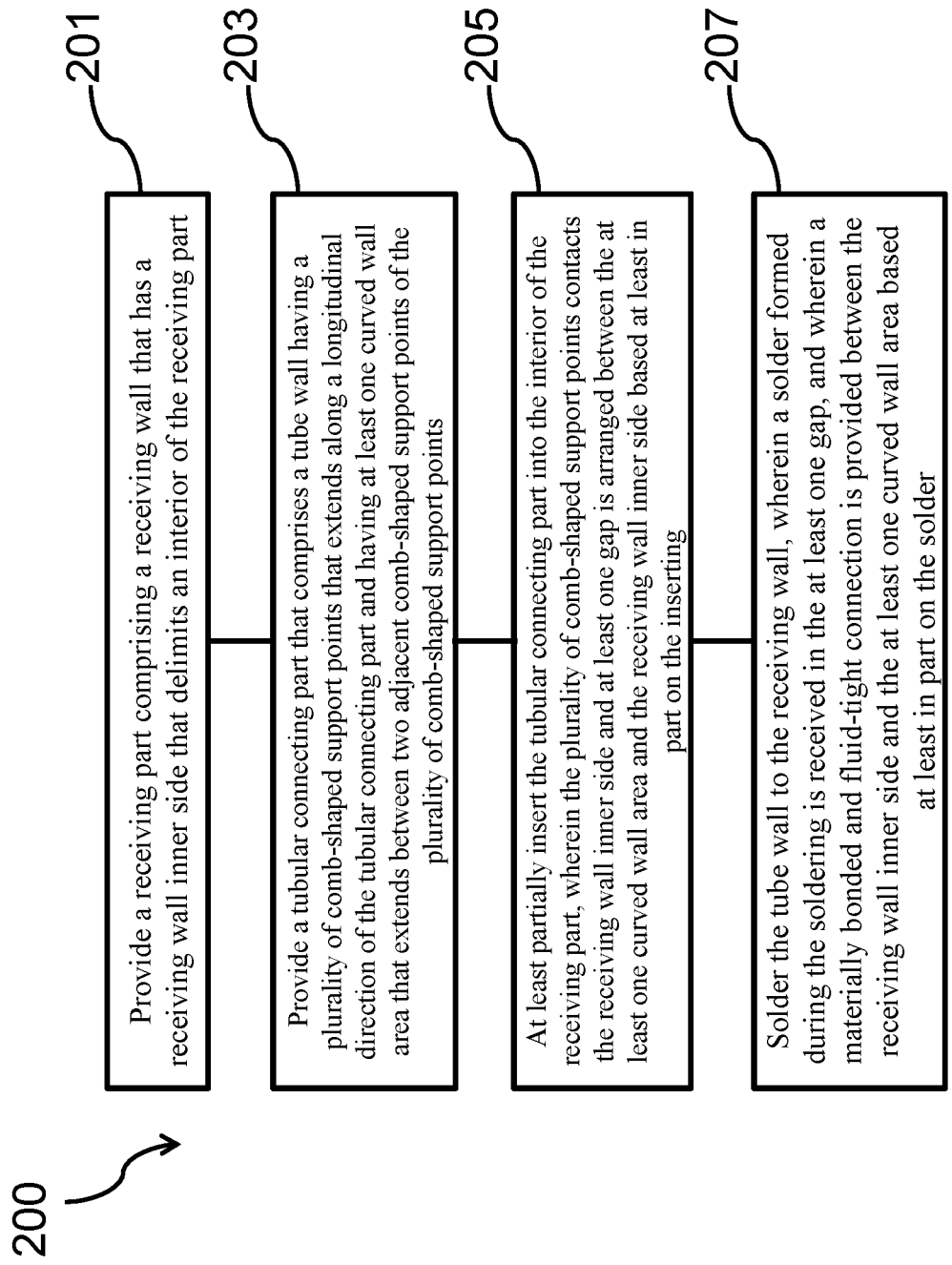

FLUID CONNECTION ARRANGEMENT

CROSS-REFERENCE

The present application is a divisional of U.S. patent application Ser. No. 17/507,234 by Geiger et al., entitled "FLUID CONNECTION ARRANGEMENT," filed Oct. 21, 2021, which claims the benefit of German Patent Application No. 10 2020 128 531.0 by Geiger et al., entitled "FLUID VERBINDUNGSANORDNUNG," filed Oct. 29, 2020, each of which are assigned to the assignee hereof, and each of which are expressly incorporated by reference in its entirety herein.

TECHNICAL FIELD

The present disclosure relates to a fluid connection arrangement for establishing a fluid connection.

BACKGROUND

A variety of fluid conduits, such as fluid tubes, are required in a vehicle to convey different types of fluid. In order to connect fluid lines to one another in a spatially limited installation space of a vehicle, fluid connection arrangements are used, through which fluid connections can be established. In conventional fluid connection arrangements consisting of metallic components, the fluidical interfaces are often soldered in order to achieve a stable attachment of the components to one another.

In order to ensure the gap width during soldering, in particular pipe ends of a conventional fluid connection arrangement that are soldered into a connection geometry often have to be calibrated in a complex manner. A corresponding conventional calibration is carried out in particular by means of a flanging machine by reducing the outer diameter of the pipe end to a defined dimension, wherein high deformation forces occur and a relative movement between the workpieces and an oiling of the workpieces being necessary, wherein the further risk of metal particles becoming detached is present, and wherein furthermore the workpieces are to be cleaned and degreased prior to soldering.

Document DE 10 2016 206 471 A1 discloses a connection arrangement between a shaft and a bore, the connection being able to be established by means of a pressing process and a subsequent soldering process.

SUMMARY

The object on which the disclosure is based is to provide a fluid connection arrangement for a fluid connection which has advantageous properties and is easy to manufacture.

This object is achieved by the subject matter with the features according to the independent claims. Examples of the disclosure are the subject matter of the figures, the description, and the dependent claims.

According to a first aspect of the disclosure, the object is achieved by a fluid connection arrangement for establishing a fluid connection, comprising a receiving part, which has a receiving wall, the receiving wall having an receiving wall inner side, which delimits an interior of the receiving part, a tubular connecting part, which is received at least partially in the interior of the receiving part, and which comprises a tube wall, the tube wall having a plurality of comb-shaped support points, which extend along a longitudinal direction of the tubular connecting part, the comb-shaped support points contacting the receiving wall inner side, the tube wall having at least one curved wall area, which extends between two adjacent comb-shaped support points, wherein between at least one curved wall area of the tubular connecting part and the receiving wall inner side of the receiving part, at least one gap is arranged, wherein a solder is received in the gap in order to provide a materially bonded and fluid-tight connection between the receiving wall inner side and the curved wall area.

In this way, for example, the technical advantage is achieved that a stable and, in particular, fluidically tight connection is ensured between the receiving part and the tubular connecting part, which connection is easy to manufacture and can advantageously withstand high pressure loads.

In particular, the receiving part, in particular the receiving wall of the receiving part, has an insertion opening, which connects the interior of the receiving part with an exterior of the receiving part. In particular, the tubular connecting part, which is received at least partially in the interior of the receiving part, extends from the interior of the receiving part through the insertion opening to the exterior of the receiving part.

In particular, the receiving wall of the receiving part has a concentric cross section, in particular a circular cross section. Thus, the receiving wall inner side of the receiving part delimits in particular a cylindrical cavity in which the tubular connecting part is received at least partially and in which the solder for the materially bonded and fluid-tight connection between the receiving wall inner side and the tube wall of the tubular connecting part is received.

In particular, the receiving part is shaped as a hollow cylindrical component, the receiving wall having an receiving wall outer side, which is formed on a side of the receiving wall facing away from the receiving wall inner side and delimits the receiving wall from an exterior of the receiving part. Here, the receiving wall outer side runs around the receiving wall inner side, in particular in a circular manner, i.e. concentrically, so that in particular the distance between the receiving wall inner side and the receiving wall outer side is constant along the circumference of the receiving part.

In particular, the receiving part is shaped as a metallic receiving part and the tubular connecting part is shaped as a metallic tubular connecting part. Thus, the solder received in the gap can provide an effective materially bonded connection, in particular a soldered connection, between the metallic receiving part and the metallic tubular connecting part.

For the solder to be able to penetrate into the gap, a solder, in particular copper solder, which is arranged in particular between the receiving part and the tubular connecting part, in particular between an end face of the tubular connecting part and a receiving wall end face of the receiving wall of the receiving part, which us opposite the end face of the tubular connecting part, is melted, in particular by the action of temperature on the fluid connection arrangement, in order to establish the soldered connection. Alternatively, the solder can also be arranged on an outside of the receiving part and/or the tubular connecting part, in particular as a piece of solder or as a solder paste.

The melted solder due to the acting capillary force penetrates into the at least one gap between the tube wall of the tubular connecting part and the receiving wall inner side of the receiving part and hardens when the fluid connection arrangement is subsequently cooled, so that the solder received and cured in the gap provides a materially bonded and fluid-tight connection between the receiving wall inner side and the tube wall.

The tube wall of the tubular connecting part has, in particular, a rotationally symmetrical cross section. The rotationally symmetrical cross section of the tube wall is defined in particular in that a cross-sectional contour of the tube wall is mirrored back onto itself by a rotation along a specific rotation angle, in particular of 120°. In particular, the rotationally symmetrical cross section of the tube wall of the tubular connecting part is not concentric, i.e. not circular.

The tube wall has a plurality of comb-shaped support points, in particular three comb-shaped support points, which are in particular arranged on the tube wall at a distance from the circumference and extend along the longitudinal direction of the tubular connecting part.

In particular, the comb-shaped support points are arranged rotationally symmetrically with respect to a central axis of the tubular connecting part, e.g. for example with three comb-shaped support points, each adjacent comb-shaped support points enclose a rotation angle of 120° with the central axis of the tubular connecting part.

The fact that the comb-shaped support points extend along the longitudinal direction of the tubular connecting part not only ensures punctual contact of the comb-shaped support points on receiving wall inner side of the receiving part, but the respective comb top of the comb-shaped support points bears against an elongated contact section of the receiving wall inner side of the receiving part.

In particular, the comb-shaped support points contact the receiving wall inner side of the receiving part in a force-fitting manner.

In particular, the comb-shaped support points each have a rounded comb top, which bears against the receiving wall inner side of the receiving part.

In particular, the tube wall has a plurality of, in particular three, curved wall areas, wherein one wall area of the plurality of wall areas extends between two adjacent comb-shaped support points, respectively. In particular, the curved wall areas are arranged rotationally symmetrically with respect to a central axis of the tubular connecting part, i.e. for example with three curved wall areas, two adjacent curved wall areas each enclose a rotation angle of 120° with the central axis of the tubular connecting part, respectively.

The plurality of comb-shaped support points and the curved wall areas, which are arranged between respectively adjacent comb-shaped support points, thus form, in particular, the circumferential tube wall of the tubular connecting part.

If the tube wall has a plurality of curved wall areas, a respective gap is arranged between each curved wall area of the plurality of curved wall areas and the receiving wall inner side of the receiving part, so that a plurality of gaps are available provided in the fluid connection arrangement for receiving the solder.

In particular, the majority of the gaps are arranged rotationally symmetrically with respect to a central axis of the tubular connecting part, i.e. for example with three gaps, two adjacent gaps each limit with the central axis of the tubular connecting part a rotation angle of 120°.

In particular, the at least one curved wall area is shaped as a convexly curved wall area, i.e. the convexly curved wall area is curved outwardly with respect to a tube interior of the tubular connecting part.

The tube wall of the tubular connecting part has a certain elasticity, so that when the tubular connecting part is inserted into the receiving part, the comb-shaped support points are deflected inwardly at least partially upon contact with the receiving wall inner side of the receiving part, so that effective insertion of the tubular connecting part into the receiving part is ensured.

If the tubular connecting part is inserted into the receiving part, the inwardly deflected comb-shaped support points apply a force to the receiving wall inner side of the receiving part. As a result, the tubular connecting part is fixed in the correct position after being inserted into the receiving part and both a detachment of the tubular connecting part from the receiving part and a twisting of the tubular connecting part with respect to the receiving part are prevented.

If the tubular connecting part is then soldered to the receiving part, the solder is received in the at least one gap between the tubular connecting part and the receiving part and the materially bonded and fluid-tight connection between the tubular connecting part and the receiving part is ensured.

In particular, the at least one gap has a crescent shape.

In particular, the radial depth of the gap transversely to the longitudinal direction of the tubular connecting part is between 0.02 mm and 0.2 mm.

In particular, the wall thickness of the tube wall of the tubular connecting part is between 0.5 mm and 1.2 mm, in particular 1.0 mm or 0.7 mm.

In particular, the solder is formed from copper.

The tube wall comprising the comb-shaped support points and the at least one curved wall area is represented by a selective pressing of the tube wall radially inward, wherein the comb-shaped support points, since they are larger in diameter, are displaced inward, so that the at least one curved wall area follows is formed into the outside.

The advantages of the soldered connection according to the disclosure between the tubular connecting part and the receiving part are distinguished by the fact that, compared to conventional soldered connections, lower deformation forces occur compared to a conventional calibration of the outer diameter, since there is no change in the wall thickness of the tube wall of the tubular connecting part, so that the manufacturing effort can be significantly reduced, since no flanging machine has to be used. In addition, when the tubular connecting part is produced, there is no relative movement between the tubular connecting part and the forming die, the forming die in particular being passed through the tubular connecting part for calibrating the outer diameter during the crimping process. In addition, lubrication and the subsequent washing of the tubular connecting part can be dispensed with during the manufacture of the tubular connecting part.

In an example, when the tubular connecting part is inserted into the receiving part, the comb-shaped support points are at least partially inwardly deformable in order to receive the tubular connecting part in the receiving part, and/or the comb-shaped support points of the tubular connecting part received in the receiving part are adapted to apply a force to the receiving wall inner side to the receiving part.

This achieves the technical advantage that positioning of the tubular connecting part within the interior of the receiving part is ensured. In particular, an advantageous positionally correct positioning is ensured, which prevents the tubular connecting part from to be loosened from the receiving part or prevents a twisting of the tubular connecting part with respect to the receiving part before the tubular connecting part is soldered to the receiving part.

In an example, the comb-shaped support points are arranged rotationally symmetrically with respect to a central axis of the tubular connecting part, and/or a plurality of curved wall areas are arranged rotationally symmetrical with respect to a central axis of the tubular connecting part.

This achieves the technical advantage that, due to the rotationally symmetrical arrangement of the comb-shaped support points and/or the plurality of curved wall areas, the circumferential distance between the comb-shaped support points, or the circumferential distance between the gaps, which are limited by the curved wall areas, is constant, so that in relation to the central axis symmetrical contact points or solder points with the receiving wall inner side of the receiving part are ensured.

In an example, the comb-shaped support points lie on a first circumferential circle of the tubular connecting part with respect to the central axis of the tubular connecting part, wherein respective central areas of a plurality of curved wall areas lying on a second circumferential circle of the tubular connecting part with respect to the central axis of the tubular connecting part, wherein the first circumferential circle has a first circle diameter which is larger than a second circle diameter of the second circumferential circle.

This achieves the technical advantage that, due to the difference between the first and second circular diameter, the comb-shaped support points are arranged further out in relation to the central axis of the tubular connecting part than the curved wall areas. In the case of a concentric or circular cross section of the receiving wall of the receiving part, this ensures that a respective gap is formed between the curved wall areas and the receiving wall, whereas the comb-shaped support points bear against the receiving wall.

In an example, a length of the comb-shaped support points along the longitudinal direction of the tubular connecting part is less than a length of the at least one gap along the longitudinal direction of the tubular connecting part.

This has the technical advantage that the solder, which is drawn up through the cavities between the gaps by the capillary force, converges above the gap and fills the remaining gap with solder.

In an example, the tubular connecting part has an insertion section which is completely received in the interior of the receiving part, the insertion section being connected to an outer section of the tubular connecting part, which extends from the insertion section, wherein the comb-shaped support points and the at least one curved wall area of the tube wall are arranged in the insertion section, and wherein the tube wall of the outer section in particular has a concentric cross section.

This achieves the technical advantage that the tubular connecting part does not have to be machined over its entire length, but rather only the insertion section of the tubular connecting part, which is completely received in the interior of the receiving part, has to be machined.

In an example, the tube wall comprising the comb-shaped support points and the at least one curved wall area, in particular in the area of the insertion section, has a constant wall thickness.

This achieves the technical advantage that the constant wall thickness of the tube wall avoids weak points in the tube wall, which could impair the connection between the tubular connecting part and the receiving part.

In an example, the receiving wall, which delimits the interior of the receiving part, has a wall end side which closes the interior transversely to an insertion direction of the tubular connecting part, wherein a cavity for receiving a solder is formed between the wall end side and an end face of the inserted tubular connecting part.

This achieves the technical advantage that the cavity between the end face of the inserted tubular connecting part and the wall end side of the receiving wall of the receiving part provides a space for receiving solder, which connects the tubular connecting part to the receiving part at the end face.

In particular, the wall end side of the receiving part is connected to the receiving wall inner side of the receiving part, so that the wall end side and the receiving wall inner side completely enclose the tube wall of the tubular connecting part.

The cavity between the end face of the inserted tubular connecting part and the wall end face enables the solder to be received before the solder is melted. If the solder introduced into the cavity is melted, in particular by heating the fluid connection arrangement, in particular by furnace soldering or induction soldering, the melted solder penetrates into the gaps between the tube wall of the tubular connecting part and the receiving wall inner side of the receiving part due to the acting capillary forces. When the solder subsequently hardens in the gaps, in particular through cooling of the fluid connection arrangement, the solder thus provides the materially bonded and fluid-tight connection between the receiving wall inner side and the tube wall.

According to a second aspect of the disclosure, the object is solved by a method for producing a fluid connection arrangement, comprising the following method steps; providing a receiving part, which has a receiving wall, the receiving wall having an receiving wall inner side, which delimits an interior of the receiving part; providing a tubular connecting part, which has a tube wall, the tube wall having a plurality of comb-shaped support points, which extend along a longitudinal direction of the tubular connecting part, the tube wall having at least one curved wall area, which extends between two adjacent comb-shaped support points; at least partially inserting the tubular connecting part into the interior of the receiving part, the comb-shaped supporting points of the tubular connecting part contacting the receiving wall inner side after insertion, and wherein, after insertion, at least one gap is arranged between the at least one curved wall area and the receiving wall inner side; and soldering the tube wall of the tubular connecting part to the receiving wall of the receiving part, a solder formed during the soldering being received in the gap in order to ensure a materially bonded and fluid-tight connection between the receiving wall inner side and the curved wall area.

This achieves the technical advantage that a stable and fluid-tight connection that is easy to produce, can be ensured between the tubular connecting part and the receiving part.

In an example, the provision of the tubular connecting part comprises a press forming of a tubular precursor with a concentric cross section, in order to obtain a tube wall with a rotationally symmetrical cross section comprising the comb-shaped support points and the at least one curved wall area, wherein the press forming in particular comprises the circumferential action of a plurality of jaws of a forming tool onto the tubular precursor.

This achieves the technical advantage that the press forming of the tubular precursor ensures that an uniform forming is ensured and, in particular, a constant wall thickness can be ensured in the tubular precursor, so that the use of a flanging machine to remove any unevenness or to compensate for manufacturing deviations is not necessary.

Here, the jaws of the forming tool in particular press the tube wall of the tubular precursor at least partially radially inwards, so that the at least one curved wall area of the tubular connecting part is obtained, and the constant volume of the comb-shaped support points is formed in that the areas next to the curved wall area are displaced radially outward.

In an example, during the insertion of the tubular connecting part into the interior of the receiving part, the comb-shaped support points of the tube wall are at least partially deformable inwards.

This achieves the technical advantage that effective introduction of the tubular connecting part into the interior of the receiving part is ensured.

In an example, the soldering comprises heating the tubular connecting part and/or the receiving part in order to melt a solder arranged between the tubular connecting part and the receiving part, the molten solder being received in the gap during the soldering and being formed to connect the tube wall of the tubular connecting part to the receiving wall of the receiving part in a fluid-tight manner by the resulting soldered connection after the solder has hardened.

This has the technical advantage that effective soldering of the tubular connecting part to the receiving part is ensured.

In particular, before the soldering, the solder is introduced into a cavity between the end face of the inserted tubular connecting part and the wall end face of the receiving part. If the solder introduced into the cavity is subsequently melted during soldering, in particular by heating the fluid connection arrangement, the melted solder penetrates into the gaps between the tube wall of the tubular connecting part and the receiving wall inner side due to the acting capillary forces. When the solder subsequently hardens in the gaps, in particular through cooling of the fluid connection arrangement, the solder thus provides the materially bonded and fluid-tight connection between the receiving wall inner side and the tube wall.

The example cited in relation to the fluid connection arrangement according to the first aspect are also considered to be examples of the method according to the second aspect.

The examples of the method according to the second aspect are also considered to be examples for the fluid connection arrangement according to the first aspect.

BRIEF DESCRIPTION OF THE DRAWINGS

Examples of the disclosure are shown in the drawings and are described in more detail below.

FIGS. 2A, 2B show views with different perspectives of a fluid connection arrangement with a tubular connection part and a receiving part according to an example; and FIG. 3 shows a method for producing a fluid connection arrangement according to an example.

DETAILED DESCRIPTION

Figure 1A:
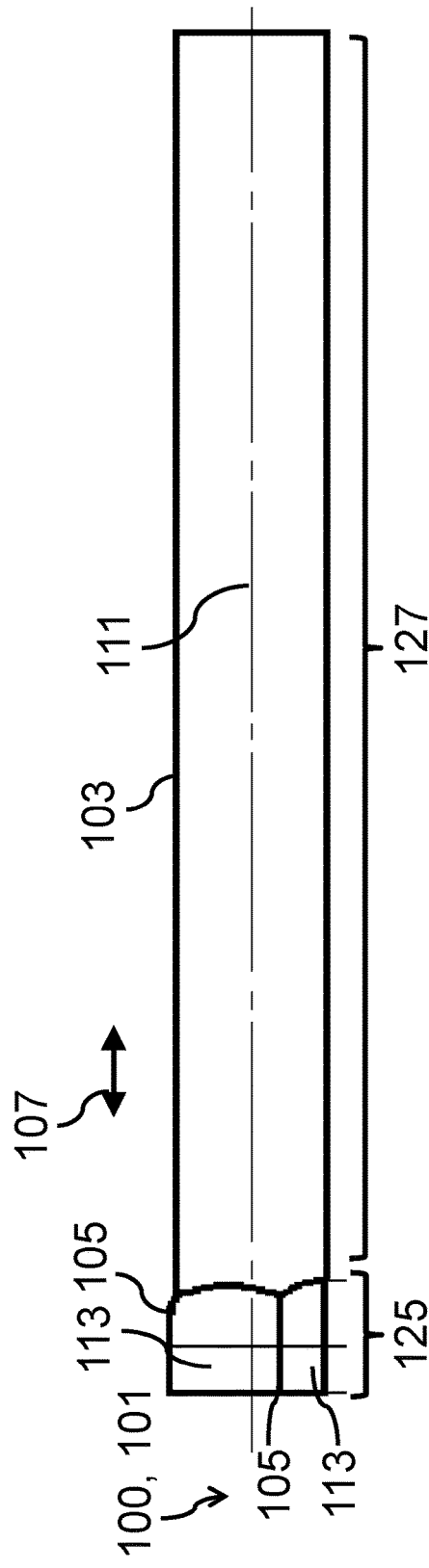
FIGS. 1A, 1B show views with different perspectives of a tubular connection part of a fluid connection arrangement according to an example.
Figure 1B:
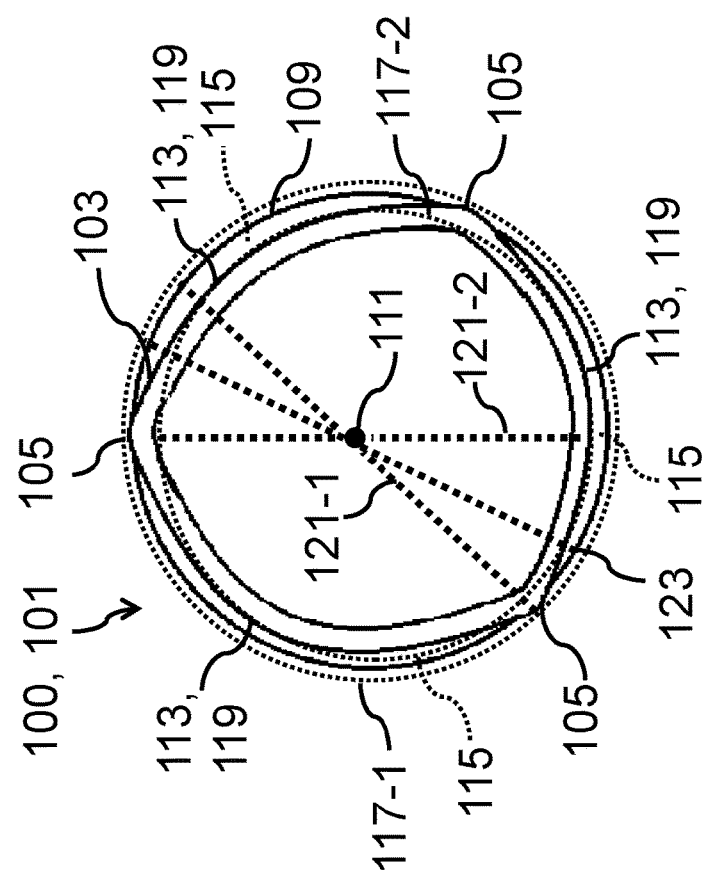

FIGS. 1A and 1B show views with different perspectives of a tubular connection part of a fluid connection arrangement according to an example. FIG. 1A shows a side view of the tubular connection part 101 of the fluid connection arrangement 100. FIG. 1B shows a cross-sectional illustration of the tubular connection part 101 of the fluid connection arrangement 100.

The tubular connecting part 101 shown in FIGS. 1A and 1B is arranged at least partially in an interior of a receiving part, not shown in FIGS. 1A and 1B, of the fluid connection arrangement 100, wherein the tubular connecting part 101 is soldered to the receiving part, e.g. the tubular connecting part 101 is connected to the receiving part by a materially bonded connection, in particular a soldered connection.

The fluid connection arrangement 100 according to the present disclosure is used to establish a fluid connection in a multiplicity of fluid-carrying systems of a vehicle. The fluid connection arrangement 100 can be used for the fluidical connection of fuel, coolant, charge air, brake fluid, water, SCR and/or transmission oil lines in vehicles. The fluid connection arrangement 100 can alternatively also be used, for example, in coolant-carrying fluid lines, which are used for cooling battery cells in an electrically driven vehicle.

In the fluid-carrying systems of a vehicle, different fluids, such as gases or liquids, are sometimes conducted under high pressure and at high temperatures. Due to the restricted installation space in a vehicle, different lines of the corresponding fluid-carrying systems often have to be connected to one another by fluidical interfaces, in order to ensure an effective fluid line. Here, high demands are made in respect to the fluidical interfaces between a corresponding fluid-carrying line and a corresponding connecting piece with regard to stability and fluid-tightness.

In particular when metallic components are used in corresponding fluid connection arrangements 100, the fluidical interfaces between the metallic components are often soldered in order to achieve a stable attachment of the metallic components to one another. In corresponding soldered connections between metallic components known from the prior art, it is often not possible to provide sufficient fluid tightness between the metallic components.

In the fluid connection arrangement 100 according to the present disclosure, however, the materially bonded connection, in particular a soldered connection, between the tubular connecting part 101 and the receiving part is fluid-tight, so that the exit of liquid at the connection point between the two components is prevented.

As can be seen in particular from FIG. 1B, the tubular connecting part 101 has a tubular wall 103 with a rotationally symmetrical cross section. The rotationally symmetrical cross section of the tube wall 103 is distinguished in particular by the fact that the contour of the tube wall is mirrored back onto itself when it is rotated along a defined rotation angle, in particular 120°. As can be seen from FIG. 1B, the rotationally symmetrical cross section of the tube wall 103 of the tubular connecting part 101, however, in particular does not have a circular shape, but rather is not concentric. The tube wall 103 of the tubular connecting part 101 has a plurality of comb-shaped support points 105 which, as can be seen from FIG. 1A, extend along a longitudinal direction 107 of the tubular connecting part 101.

The comb-shaped support points 105 of the tubular connecting part 101 contact a receiving wall inner side 109, shown only schematically in FIG. 1B, of a receiving wall of a receiving part, in order to connect the tubular connecting part 101 to the receiving part. In particular, the comb-shaped support points 105 bear against the receiving wall inner side 109 of the tube wall in a force-fitting manner. FIG. 1B shows that the tube wall 103 of the tubular connecting part 101 has a plurality of, in particular three, comb-shaped support points 105, which are arranged in a rotationally symmetrical manner with respect to the central axis 111 of the tubular connecting part 101, in particular with a rotation angle of 120°. As a result of the rotationally symmetrical arrangement of the comb-shaped support points 105, an effective circumferential fixing in the correct position of the tubular connecting part 101 can be ensured in the receiving part.

As can also be seen from FIG. 1B, the tube wall 103 of the tubular connecting part 101 has a plurality of, in particular three, curved wall areas 113, one curved wall area 113 each extending between two adjacent comb-shaped support points 105.

As can also be seen from FIG. 1B, a respective gap 115 is arranged between the curved wall areas 113 of the tubular connecting part 101 and the receiving wall inner side 109 of a receiving wall of a receiving part. The gaps 115 are each designed to receive a solder, not shown in FIGS. 1A and 1B, in order to ensure a materially bonded and fluid-tight connection between the receiving wall inner side 109 of the respective curved wall area 113. The gaps 115 in particular have a crescent shape.

FIG. 1B shows that the tube wall 103 of the tubular connecting part 101 has a plurality of, in particular three, curved wall areas 113, which are arranged rotationally symmetrically with respect to the central axis 111 of the tubular connecting part 101, in particular with a rotation angle of 120°. The rotationally symmetrical arrangement of the curved wall areas 113 or the gaps 115 can ensure an effective circumferential materially bonded and fluid-tight seal between the tubular connecting part 101 and the receiving part.

FIG. 1B shows that the comb-shaped support points 105 lie on a first circumferential circle 117-1 of the tubular connecting part 101 in relation to the central axis 111 of the tubular connecting part 101, and that respective central regions 119 of the curved wall areas 113 lie on a second circumferential circle 117-2 of the tubular connecting part 101 in relation to the central axis 111 of the tubular connecting part 101, the first circumferential circle 117-1 having a first circle diameter 121-1 which is greater than a second circle diameter 121-2 of the second circumferential circle 117-2.

FIG. 1B also shows that the first circular diameter 121-1 is somewhat larger than an inner diameter 123 of the receiving wall of a receiving part. This means that when the tubular connecting part 101 is inserted into the receiving part, the comb-shaped support points 105 can deflect inward and, after insertion, press against the receiving wall inner side 109 of the receiving part, thereby fixing the tubular connecting part 101 in the correct position until soldering and thus prevent a loosening of both connection partners and a twisting of the tubular connecting part 101.

Thus, the tube wall 103 of the tubular connecting part 101 can be at least partially deformed inwards, in order to receive the tubular connecting part 101 in the receiving part.

From FIG. 1A it can be seen that the tubular connecting part 101 has an insertion section 125, which is completely received in the interior of the receiving part, not shown in FIG. 1A, and wherein an outer section 127 extends from the insertion section 125, which is received in the receiving part not shown in FIG. 1A.

From FIG. 1A it can be seen that the rotationally symmetrical cross section of the tubular connecting part 101 comprising the comb-shaped support points 105 and the curved wall areas 113 is formed in the insertion section 125 and not in the outer section 127. The outer section 127 of the tubular connecting part 101 has a concentric cross section.

Furthermore, the tube wall 103 comprising the comb-shaped support points 105 and the curved wall areas 113, in particular the tube wall 103 of the insertion section 125, has a constant wall thickness.

During the production of the tube wall 103 comprising the comb-shaped support points 105 and the curved wall areas 113, in particular in the insertion section 125, the outer diameter of the tube wall 103 is not reduced rotationally symmetrically in an axial movement over part of the solder surface, but the tube wall 103, in particular in the insertion section 125, is partially deformed inwards and is transferred into the polygonal shape shown in FIGS. 1A and 1B. The polygonal shape is applied from the outside by means of partial pressure without a relative movement between tools, so that a partial flattening of the tube wall 103 is achieved in the area of the curved wall areas 113.

In this case, lower deformation forces occur, since there is no change in the wall thickness of the tube wall 103. A conventionally required calibration of the insertion section 125 of the tube wall 103 with a flanging machine is thus dispensed with, so that there is little manufacturing effort.

Furthermore, there is no relative movement between the tube and the forming die, so that the risk of contamination is reduced. In addition, there is no need for the components to be lubricated and there is no need for a corresponding washing process.

FIGS. 2A and 2B show views with different perspectives of a fluid connection arrangement with a tubular connection part and a receiving part according to an example.

The fluid connection arrangement 100 shown in FIGS. 2A and 2B comprises the tubular connection part 101 shown in FIG. 1, which is received at least partially in the interior of a receiving part 129.

The tube wall 103 of the tubular connecting part 101 has a plurality of, in particular three, comb-shaped support points 105, which extend along the longitudinal direction 107 of the tubular connecting part 101. The comb-shaped support points 105 contact the receiving wall inner side 109 of the receiving part 129.

The tube wall 103 of the tubular connecting part 101 also has a plurality of, in particular three, curved wall areas 113 which each extend between two adjacent comb-shaped support points 105.

Between the respective curved wall area 113 and the receiving wall inner side 109 of the receiving part 129, a respective gap 115 is arranged, which is adapted to receive a solder, not shown in FIGS. 2A and 2B, in order to provide a materially bonded connection between the receiving wall inner side 109 of the receiving part 129 and the curved wall areas 113 of the tubular connecting part 101.

As it is only shown schematically in FIG. 2A, in particular a length 131 of the comb-shaped support points 105 along the longitudinal direction 107 of the tubular connecting part 101 is less than a length 133 of the gaps 115 along the longitudinal direction 107 of the tubular connecting part 101.

This ensures that the solder, which is drawn up through the gap 115 by the capillary force, converges above the gaps 115 and fills the remaining gap 115 and thus ensures a pressure-resistant, materially bonded, and fluid-tight connection between the tubular connecting part 101 and the receiving part 129.

FIG. 2A further shows that a wall end side 136 of the receiving wall 135 of the receiving part 129 delimits the interior of the receiving part 129, the wall end side 136 closing off the interior of the receiving part 129 transversely to an insertion direction 137 of the tubular connecting part 101 into the receiving part 129. The wall end side 136 is connected to the receiving wall inner side 109. The wall end side 136 and the receiving wall inner side 109 thus enclose the received tubular connecting part 101.

A cavity 141 for receiving solder is formed between the receiving wall 135, in particular a wall end side 136 of the receiving wall 135, and an end face 139 of the tubular connecting part 101 introduced into the receiving part 129.

After the solder received in the cavity 141 has been heated, the solder melted thereby penetrates into the gaps 115 as a result of the capillary forces that occur. After the fluid connection arrangement 100 has cooled and the solder has hardened, a materially bonded and fluid-tight connection between the receiving wall inner side 109 of the receiving part 129 and the tube wall 103 of the tubular connecting part 101 is ensured.

The receiving part 129, in particular the receiving wall 135 of the receiving part 129, has an insertion opening 143 through which the tubular connecting part 101 is inserted into the interior of the receiving part 129.

FIG. 3 shows a method for producing a fluid connection arrangement according to an example.

The method 200 comprises as a first step, the provision 201 of a receiving part 129, which has a receiving wall 135, the receiving wall 135 having a receiving wall inner side 109 which delimits an interior of the receiving part 129.

The method 200 comprises, as a second step, the provision 203 of a tubular connecting part 101, which has a tube wall 103, the tube wall 103 having a plurality of comb-shaped support points 105, which extend along a longitudinal direction 107 of the tubular connecting part 101, the tube wall 103 having at least one curved wall area 113 which extends between two adjacent comb-shaped support points 105.

The method 200 comprises, as a third step, at least partially inserting 205 the tubular connecting part 101 into the interior of the receiving part 129, the comb-shaped support points 105 of the tubular connecting part 101 contacting the receiving wall inner side 109 after the insertion 205, and wherein after the insertion 205 between the at least a curved wall area 113 and the receiving wall inner side 109 at least one gap 115 is arranged.

The method 200 comprises, as a fourth step, the soldering 207 of the tube wall 103 of the tubular connecting part 101 to the receiving wall 135 of the receiving part 129, a solder formed during the soldering 207 being received in the gap 115 in order to provide a materially bonded and fluid-tight connection between the receiving wall inner side 109 and the curved wall portion 113.

All the features explained and shown in connection with individual examples of the disclosure can be provided in different combinations in the subject matter according to the disclosure in order to realize their advantageous effects at the same time.

The scope of protection of the present disclosure is given by the claims and is not restricted by the features explained in the description or shown in the figures.

REFERENCE LIST

100 Fluid connection arrangement
101 Tubular connecting part
103 Tube wall
105 Comb-shaped support points
107 Longitudinal direction of the tubular connecting part
109 Receiving wall inner side
111 Central axis of the tubular connecting part
113 Curved wall area
115 Gap
117-1 First circumferential circle
117-2 Second circumferential circle
119 Central region of the curved wall area
121-1 First circle diameter
121-2 Second circle diameter
123 Inner diameter of the outer part
125 Insertion section of the tubular connecting part
127 Outer section of the tubular connecting part
129 Receiving part
131 Length of a comb-shaped support point
133 Length of a gap
135 Receiving wall of the receiving part
136 Wall end side
137 Insertion direction of the tubular connecting part into the receiving part
139 End face of the tubular connecting part
141 Cavity
143 Slot
200 Method for producing a fluid connection assembly
201 Providing a receiving part
203 Providing a tubular connecting part
205 At least partially, inserting the tubular connecting part into the receiving part
207 Soldering the tube wall to the receiving wall

What is claimed is:

1. A method for producing a fluid connection arrangement, comprising:
providing a receiving part comprising a receiving wall that has a receiving wall inner side that delimits an interior of the receiving part;
providing a tubular connecting part that comprises a tube wall having a plurality of comb-shaped support points that extends along a longitudinal direction of the tubular connecting part and having at least one curved wall area that extends between two adjacent comb-shaped support points of the plurality of comb-shaped support points, wherein providing the tubular connecting part comprises press forming a tubular precursor with a concentric cross-section to obtain the tube wall of the tubular connecting part with a rotationally symmetrical cross-section comprising the plurality of comb-shaped support points and the at least one curved wall area, wherein the press forming comprises a circumferential action of a plurality of jaws of a forming tool on the tubular precursor, wherein the press forming of the tubular precursor ensures a uniform forming and a constant wall in the tubular precursor;
at least partially inserting the tubular connecting part into the interior of the receiving part, wherein the plurality of comb-shaped support points contacts the receiving wall inner side and at least one gap is arranged between the at least one curved wall area and the receiving wall inner side after the inserting; and
soldering the tube wall of the tubular connecting part to the receiving wall of the receiving part, wherein a solder formed during the soldering is received in the at least one gap, and wherein a materially bonded and fluid-tight connection is provided between the receiving wall inner side and the at least one curved wall area based at least in part on the solder.

2. The method of claim 1, wherein press forming the tubular precursor comprises:
pressing, using the plurality of jaws of the forming tool, the tube wall of the tubular connecting part of the tubular precursor at least partially radially inward, wherein the at least one curved wall area is obtained based at least in part on the pressing, and wherein a constant volume of the plurality of comb-shaped support points is formed based at least in part on areas next to the at least one curved wall area being displaced radially outward.

3. The method of claim 1, wherein, during insertion of the tubular connecting part into the interior of the receiving part, the plurality of comb-shaped support points of the tube wall are at least partially deformable inwards.

4. The method of claim 1, wherein the soldering comprises:
heating the tubular connecting part to melt the solder, molten solder being received in the at least one gap during the soldering, wherein a resulting soldered connection connects the tube wall of the tubular connecting part to the receiving wall of the receiving part in a fluid-tight manner after the solder has hardened.

5. The method of claim 1, wherein the soldering comprises:
heating the receiving part to melt the solder, molten solder being received in the at least one gap during the soldering, wherein a resulting soldered connection connects the tube wall of the tubular connecting part to the receiving wall of the receiving part in a fluid-tight manner after the solder has hardened.

6. The method of claim 1, wherein the soldering comprises:
heating the tubular connecting part and the receiving part to melt the solder, molten solder being received in the at least one gap during the soldering, wherein a resulting soldered connection connects the tube wall of the tubular connecting part to the receiving wall of the receiving part in a fluid-tight manner after the solder has hardened.

7. The method of claim 1, further comprising:
arranging the solder between the tubular connecting part and the receiving part.

8. The method of claim 7, wherein the soldering comprises:
melting the solder arranged between the tubular connecting part and the receiving part, wherein molten solder is received in the at least one gap based at least in part on the melting.

9. The method of claim 1, further comprising:
introducing, prior to the soldering, the solder into a cavity between an end face of the inserted tubular connecting part and a wall end face of the receiving part.

10. The method of claim 1, further comprising:
cooling, after the soldering, the solder, wherein the solder hardens in the at least one gap to provide the materially bonded and fluid-tight connection between the receiving wall inner side and the at least one curved wall area based at least in part on the solder.

* * * * *